(12) United States Patent
Noda et al.

(10) Patent No.: US 7,426,536 B1
(45) Date of Patent: Sep. 16, 2008

(54) COMMUNICATION PROMOTION METHOD AND SYSTEM

(75) Inventors: Masahide Noda, Kawasaki (JP); Kazuki Matsui, Kawasaki (JP); Yasuhide Matsumoto, Kawasaki (JP); Masahiko Murakami, Kawasaki (JP); Tatsuro Matsumoto, Kawasaki (JP); Masahiro Matsuda, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 497 days.

(21) Appl. No.: 09/628,352

(22) Filed: Jul. 28, 2000

(30) Foreign Application Priority Data

Oct. 14, 1999 (JP) ............................ 11-292808

(51) Int. Cl.
*G06F 15/16* (2006.01)
*G06F 3/048* (2006.01)
*G06F 3/00* (2006.01)

(52) U.S. Cl. .............. 709/204; 709/207; 715/706; 715/753; 715/758

(58) Field of Classification Search ............ 709/204, 709/206–207; 345/706, 708, 710, 733, 736, 345/758; 715/706, 753, 758
See application file for complete search history.

(56) References Cited

U.S. PATENT DOCUMENTS

| 5,491,743 | A | * | 2/1996 | Shiio et al. .................. 709/204 |
| 5,736,982 | A | * | 4/1998 | Suzuki et al. ................ 345/706 |
| 5,793,365 | A | * | 8/1998 | Tang et al. ................... 345/758 |
| 5,802,253 | A | * | 9/1998 | Gross et al. .................. 709/206 |
| 5,828,839 | A |   | 10/1998 | Moncreiff |
| 5,872,926 | A | * | 2/1999 | Levac et al. .................. 709/206 |
| 5,880,731 | A | * | 3/1999 | Liles et al. ................... 345/758 |
| 5,928,325 | A | * | 7/1999 | Shaughnessy et al. ....... 709/206 |
| 5,943,049 | A | * | 8/1999 | Matsubara et al. .......... 345/715 |
| 6,061,716 | A |   | 5/2000 | Moncreiff |
| 6,119,147 | A | * | 9/2000 | Toomey et al. .............. 709/204 |
| 6,189,028 | B1 | * | 2/2001 | Bucher ........................ 709/207 |
| 6,212,548 | B1 | * | 4/2001 | DeSimone et al. .......... 709/204 |

(Continued)

FOREIGN PATENT DOCUMENTS

JP 9-81353 3/1997

(Continued)

OTHER PUBLICATIONS

On-Screen Characters Give Chatting a New Dimension:[Metro Edition] Joe Kilsheimer of The Sentinel Staff. Orlando Sentinel. Orlando, Fla.: Aug. 5, 1995. p. E.1.*

(Continued)

*Primary Examiner*—Glenton B. Burgess
*Assistant Examiner*—Aaron Strange
(74) *Attorney, Agent, or Firm*—Staas & Halsey LLP (57) ABSTRACT

A communication promotion method is provided to appropriately support communication by a plurality of users in different environments. A character 2, operable by an IRC client 5, is linked to or installed in a user terminal 8. An administration device 3 detects a specific event in a channel and sends a specific command to the IRC client 5 via IRC. Commands do not always have to be sent to all of the IRC client 5, and may be different according to the IRC client 5. The user terminal 8 detects the aforesaid command and sends it to the character 2. Characters at each user terminal 8 operate as specified by the command.

11 Claims, 7 Drawing Sheets

U.S. PATENT DOCUMENTS

| | | | |
|---|---|---|---|
| 6,345,290 B2 | 2/2002 | Okada et al. | 709/204 |
| 6,362,836 B1 * | 3/2002 | Shaw et al. | 709/207 |
| 6,434,604 B1 * | 8/2002 | Harada et al. | 709/207 |
| 6,529,942 B1 * | 3/2003 | Gilbert | 709/206 |
| 6,571,275 B1 * | 5/2003 | Dong et al. | 709/209 |
| 6,604,130 B2 * | 8/2003 | Donoho et al. | 709/204 |
| 6,681,245 B1 * | 1/2004 | Sasagawa | 709/206 |
| 6,690,773 B1 * | 2/2004 | Law | 379/88.22 |

FOREIGN PATENT DOCUMENTS

| | | |
|---|---|---|
| JP | 9-138767 | 5/1997 |
| JP | 9-214486 | 8/1997 |
| JP | 11-119880 | 4/1999 |
| JP | 2000-76167 | 3/2000 |
| WO | WO 98/21664 | 5/1998 |
| WO | WO 99/03034 | 1/1999 |

OTHER PUBLICATIONS

Okada Sumiyo, et al., Patent Abstracts of Japan, "Chat System and Chat Server and Client and Recording Medium", Publication Laid Open Patent Publication No. 11-184786, Publication Date: Jul. 9, 1999.

European Search Reports.

* cited by examiner

| Event | Operation Instruction | Destination | Control Instruction |
|---|---|---|---|
| Statement containing participant name<br>Participate in channel<br>Chatting is frequent<br>... | "Notify"<br>"Welcome"<br>"Greetings"<br>"Happy"<br>... | User specified by name<br>New participant<br>Existing participant<br>User participating in chat<br>... | ARM(LEFT) WAVE 3<br>ARM(RIGHT) UP 5<br>HEAD DOWN<br>FACE SMILE<br>... |

Received Operation Instructions

| Origin | Destination | Event Detection Time | Operation Instruction | Serial Number |
|---|---|---|---|---|
| Administration device | All on channel | 15:00:02 | Make face blush | 3 |
| Administration device | All on channel | 15:00:01 | Say "Why are you raising your hand?" | 2 |
| Administration device | All on channel | 15:00:00 | Raise hand | 1 |
| Administration device | All on channel | 15:00:03 | Say "I'm embarrassed" | 4 |

Operation Instructions in Execution Sequence

| Origin | Destination | Event Detection Time | Operation Instruction | Serial Number |
|---|---|---|---|---|
| Administration device | All on channel | 15:00:00 | Raise hand | 1 |
| Administration device | All on channel | 15:00:01 | Say "Why are you raising your hand?" | 2 |
| Administration device | All on channel | 15:00:02 | Make face blush | 3 |
| Administration device | All on channel | 15:00:03 | Say "I'm embarrassed" | 4 |

COMMUNICATION PROMOTION METHOD AND SYSTEM

BACKGROUND OF THE INVENTION

1. Technical Field

The present invention pertains to a chat system in which a plurality of users connected to a network can mutually share a virtual chat space. The chat space is configured virtually on a network so that a plurality of users converse with text messages. More precisely, the present invention pertains to technology for promoting communication between users in the aforementioned chat system.

A chat system in the present invention is a system having a plurality of chat devices. A chat device is connected to a network and can share a virtual chat space. By operating a chat device users can send and receive text messages in a mutually interactive format.

IRC (Internet Relay Chat) is one type of chat system structured based on the IRC protocol (RFC1459). IRC includes IRC servers and IRC clients connected on the Internet.

An IRC client shares a chat space known as a channel, and can send and receive text messages in real time. An IRC server broadcasts messages from an IRC client to other IRC clients in the same channel.

Each IRC client is uniquely specified using an identifier known as a nickname. Each channel has a channel name uniquely specifying the channel. Also, each channel is correlated with a topic indicating the subject of conversation in a channel. In addition, each channel is correlated with a mode indicating the channel characteristics. The current channel is the channel in which a user participating in a plurality of channels is making a statement. A subchannel is a channel other than the current channel when a user is participating in a plurality of channels.

In the present invention a character includes both character devices having a physical substance and virtual characters that do not have a physical substance. The former character device is connected by a wire or wirelessly to a user terminal such as a PC (personal computer) or WS (work station), etc. The character device can operate according to control instructions from a user terminal. A virtual character can be displayed on a screen and operated according to a program operated at a user terminal.

2. Description of Related Art

In Japanese Patent Application Hei 10-241310 the present inventor proposed a communication device that combined a chat system and a character device. This invention operated a character device capable of communicating by wire or wirelessly with a user terminal such as a PC in accordance with keywords included in a message. Doing so made it possible to implement communication that was more intuitive and easier to understand than communication based on text messages alone.

The aforementioned invention assumed that the character device operated by reacting to keywords in an originated message. Therefore, when a keyword is sent to a virtual chat space, the character devices of all users in the space perform only the same operation in response to the keyword.

However, in an actual chat system a plurality of users is conversing under various different environments. For example, it is possible to conceive of a situation in which one user actively makes statements, but another user just watches other people's statements. In this sort of situation effective intuitive communication does not occur, even if the same operation is made to happen at each user's character device.

Also, in IRC a user can participate in a plurality of chat spaces at the same time. Therefore a plurality of control instructions may be sent from the user terminal to the character device at almost the same time. It is also possible to sequentially execute the issued control instructions.

However, even if a character is continuously operated for a short time, it is not effective unless the user pays attention to the various operations. In the aforesaid invention a plurality of control instructions issued within a very short time are not discarded, or a priority order is not applied in executing the control instructions, so one cannot say that it optimizes actual communication.

In addition, the aforementioned invention focused only on a character device having a physical substance as a means for carrying out intuitive communication. However, one could conceive of obtaining the same effect by utilizing a virtual character that does not have physical substance, so a special hardware constitution is not necessary.

The object of the present invention is to provide technology for promoting and smoothing communication that is suitable for a diverse communication environment in which a plurality of users in different environments chat simultaneously using character devices that have physical substance and virtual characters that do not have substance.

SUMMARY OF THE INVENTION

In order to solve the aforementioned problems, an aspect of the present invention provides a communication promotion method used in a chat system having a plurality of chat devices. The chat devices share any of virtual chat spaces being configured on a network and can send and receive messages among themselves. The method includes:

A. Linking or installing in the aforesaid chat device a character that can be operated according to a predetermined operation instruction received by the chat device, B. Detecting a predetermined event occurring within the aforesaid chat space, C. Based on the detected event, determining one or a plurality of operation instructions for operating the character, D. Determining one or a plurality of chat devices to be sent an operation instruction from among the chat devices sharing the chat space, and E. Sending an operation instruction via the chat system to the chat device that is the operation instruction destination and operating the character.

Examples of chat systems include IRC, for example. Character includes both character devices having a physical substance and virtual characters displayed on a chat device. Event includes, for example, joining or quitting a channel, changing the mode, when the number of channel participants exceeding a predetermined number, and a statement not being made for longer than a specified time.

One or a plurality of operation instructions corresponds to a specific event. For example, let us consider the event "join a channel". Various different operation instructions are sent to a user newly joining a channel and to users already joining the channel. By doing so the character of the user newly joining the channel operates so as to express "Welcome", for example. The characters of users already joining the channel are operated so as to express "Hello."

Another aspect of the present invention provides a communication promotion method wherein an operation instruction's originating address, an operation instruction's destination address, and an event detection time are sent to the destination together with the operation instruction.

By sending information such as the origin and destination, event detection time, etc., it is possible to select an operation instruction based on this information when a plurality of operation instructions overlap and are sent. In addition, one can envision a communication promotion method that selects an operation instruction to send to the destination based on some optional combination of the operation instruction's originating address, the operation instruction's destination address, and the event detection time.

Another aspect of the present invention is a communication promotion system used in a chat system having a plurality of chat devices. The chat devices share any of virtual chat spaces being configured on a network and can send and receive messages among themselves. The system includes a character, association table, detection means, first determination means, second determination means, and communication means.

A character is linked to or installed in the chat device and can be operated in accordance with a predetermined operation instruction received by the chat device. The association table relationally stores a predetermined event occurring in the chat space, an operation instruction that operates a character, and an operation instruction destination. The detection means detects a predetermined event, based on the association table. The first determination means determines one or a plurality of operation instructions in accordance with the detected event, based on the association table. The second determination means determines one or a plurality of chat devices to be sent the determined operation instruction from among the chat devices sharing the chat space, based on the association table. The communication means sends the operation instruction via the chat system to the chat device that is the operation instruction destination in order to operate the character.

This has the same operating effect as the aforementioned first aspect.

Another aspect of the present invention provides the communication system of the aforesaid third aspect, wherein the aforesaid communication means sends an originating address of operation instruction, a destination address of operation instruction, and an event detection time to the destination together with the operation instruction.

This has the same operating effect as the aforesaid second invention.

Another aspect of the present invention provides an administration device used in a chat system having a plurality of chat devices. The chat devices share any of virtual chat spaces being configured on a network and can send and receive messages among themselves. This administration device has an association table, detection means, first determination means, second determination means, and communication means.

The association table relationally stores a predetermined event occurring in the chat space, and a predetermined operation instruction that operates a character linked to or installed in the chat device, and an operation instruction destination. The detection means detects a predetermined event, based on the association table. The first determination means determines one or a plurality of operation instructions in accordance with the detected event, based on the association table. The second determination means determines one or a plurality of chat devices to be sent the determined operation instruction from among the chat devices sharing the chat space, based on the association table. The communication means sends an operation instruction via the chat system to the chat device that is the operation instruction destination in order to operate the character.

This has the operating effect of controlling the character as in the aforementioned first invention.

Another aspect of the present invention provides the administration device of the aforementioned fifth aspect of the present invention. The aforementioned communication means sends an originating address of operation instruction, a destination address of operation instruction, and an event detection time to the destination together with the operation instruction.

The administration device has the same operating effect as the aforesaid second invention.

Another aspect of the present invention provides the administration device of the aforementioned fifth aspect of the present invention. The administration device has a control means that selects one or a plurality of operation instructions based on predetermined conditions when a plurality of operation instructions occurs with the same chat device as the destination, and sends the operation instruction(s) to the aforesaid chat device.

A predetermined condition can be the following sorts of conditions. If the interval between occurrences of the same event is within a predetermined time, all but the first event are ignored. Or a priority order may be assigned to events in advance. If the interval between occurrences of events is less than a predetermined time, only the operation instruction related to the highest priority event is sent. Additionally, various conditions for selecting an operation instruction from among a plurality of operation instructions can be envisioned.

Another aspect of the present invention provides the administration device of the aforementioned fifth aspect of the present invention. When a plurality of characters is linked to or installed in a chat device, the second determination means can determine one or a plurality of operated characters from among the chat device's characters, based on an event. Further, the aforesaid communication means sends an operation instruction that includes a character specification to the chat device associated with the character in order to operate the character.

One chat device 'A' may have a plurality of characters $C_1$, $C_2$ .... If another user triggers an event specifying chat device A's character $C_1$, an operation instruction associated with the event and a character $C_1$ specification are sent to chat device A. As a result, only character $C_1$ operates, and the other characters do not operate.

Another aspect of the present invention is a character linked to or installed in a chat device. The chat device is connected to a network and shares any of virtual chat spaces being configured on the network and which can send and receive messages. The character has a communication means and operation means.

The communication means sends and receives operation instructions for operating the character between the aforesaid chat device and the character. The operation means operates the character based on the aforesaid received operation instruction.

Characters include character devices that have a physical substance and virtual characters. An operation instruction received via the communication means is executed by the operation means. Examples of operation means include a stepping motor, etc., for physical characters and a program for operating the character if it is a virtual character.

Another aspect of the present invention is an administration device used in a chat system having a plurality of chat devices. The chat devices share any of virtual chat spaces being configured on a network and can send and receive messages among themselves. The administration device has an association table, detection means, determination means, and communication means.

The association table relationally stores a predetermined event occurring in the chat space, an operation instruction that operates a character linked to or installed in the aforesaid chat device, and an operation instruction destination. The detection means detects a predetermined event, based on the association table. The determination means determines an operation instruction in accordance with the detected event, based on the association table. The communication means sends the determined operation instruction to the chat device's character in order to operate the character.

Having a character controlled by the administration device has almost the same operating effect as the aforementioned second aspect of the present invention, except for the point about the character being one linked to or installed in a user terminal operated by the administration device.

It is also possible to conceive of a case in which a plurality of characters is linked to or installed in a user terminal. In this case, when an event occurs that includes a specification for a character, the administration device sends an operation instruction only to the specified character.

Another aspect of the present invention provides a computer-readable recording medium recording an administration program used in any chat device in a chat system. A plurality of chat devices which share any of virtual chat spaces being configured on a network and can send and receive messages among themselves. The administration program executing the following steps A through E:

A. Preparing an association table that relationally stores a predetermined event occurring in the chat space, a predetermined operation instruction that operates a character linked to or installed in the aforesaid chat device, and an operation instruction destination, B. Detecting a predetermined event, based on the association table, C. Determining one or a plurality of operation instructions in accordance with the detected event, based on the association table, D. Determining one or a plurality of chat devices to be sent the determined operation instruction from among the chat devices sharing the aforesaid chat space, based on the association table, and E. Sending an operation instruction via the chat system to the chat device that is the operation instruction destination in order to operate the character.

This has the same operating effect as the administration device in the aforesaid third aspect of the present invention.

Another aspect of the present invention provides a computer-readable recording medium recording an administration program used in chat devices. The chat devices share any of virtual chat spaces being configured on a network and can send and receive messages among themselves. The administration program executing the following steps A through D:

A. Preparing an association table that relationally stores a predetermined event occurring in the chat space, a predetermined operation instruction that operates a character linked to or installed in the aforesaid chat device, and the operation instruction destination, B. Detecting a predetermined event, based on the association table, C. Determining an operation instruction in accordance with the detected event, based on the association table, D. Sending the determined operation instruction to the chat device's character in order to operate the character.

This has the same operating effect as the administration device in the aforesaid seventh aspect.

According to the present invention, a character that a user has is suitably operated for each user. The character operation frequency is controlled giving consideration to the extent needed to make a person notice the respective operation. Therefore communication can be smoothed and promoted in a plurality of chat spaces in which a plurality of users in different environments chats simultaneously.

DETAILED DESCRIPTION OF THE PREFERRED EMBODIMENTS

Next, a communication promotion system in accordance with the present invention shall be described in detail with reference to drawings.

First Embodiment

Constitution (1) Overall Constitution

Figure 1:
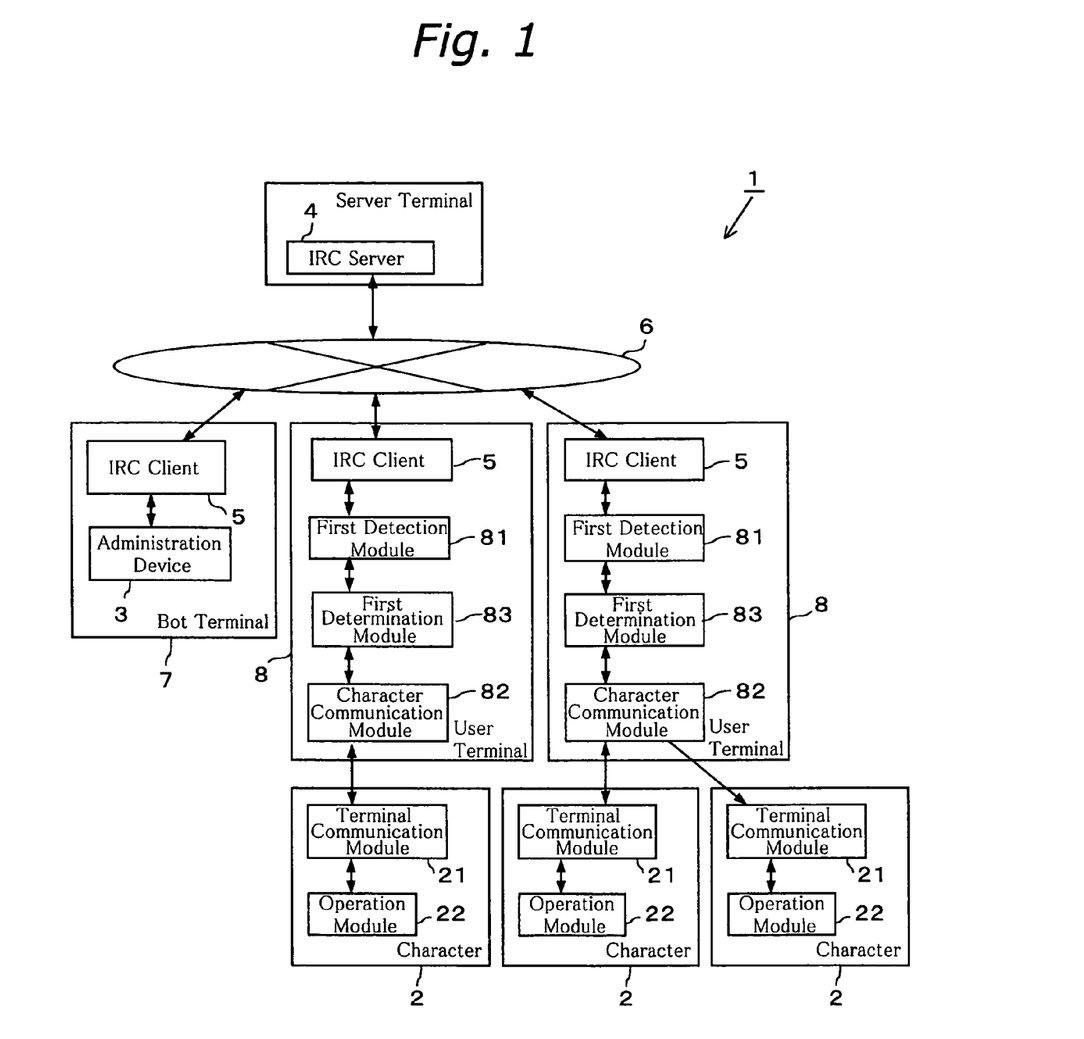
FIG. 1 is an overall structural diagrammatical view of a communication promotion system in accordance with an embodiment of the present invention.

FIG. 1 is a drawing showing the overall constitution of a communication promotion system 1 in accordance with an embodiment of the present invention. A communication promotion system in accordance with the embodiment has a character 2 and an administration device 3 added to an IRC. The IRC has an IRC server 4, an IRC client 5, and Internet 6.

The character 2 can communicate by wire or wirelessly with a user terminal 8 operated by the IRC client 5. In this embodiment the character 2 is a character 2 device that has a physical substance, but it may also be a virtual character 2. Also, a plurality of characters 2 can be provided at the user terminal 8.

The administration device 3 is provided in a bot terminal 7 operated by the IRC client 5. The IRC client 5 at the bot terminal 7 is operated by a program and participates in a channel in the guise of the user.

(2) Administration Device

Figure 2:
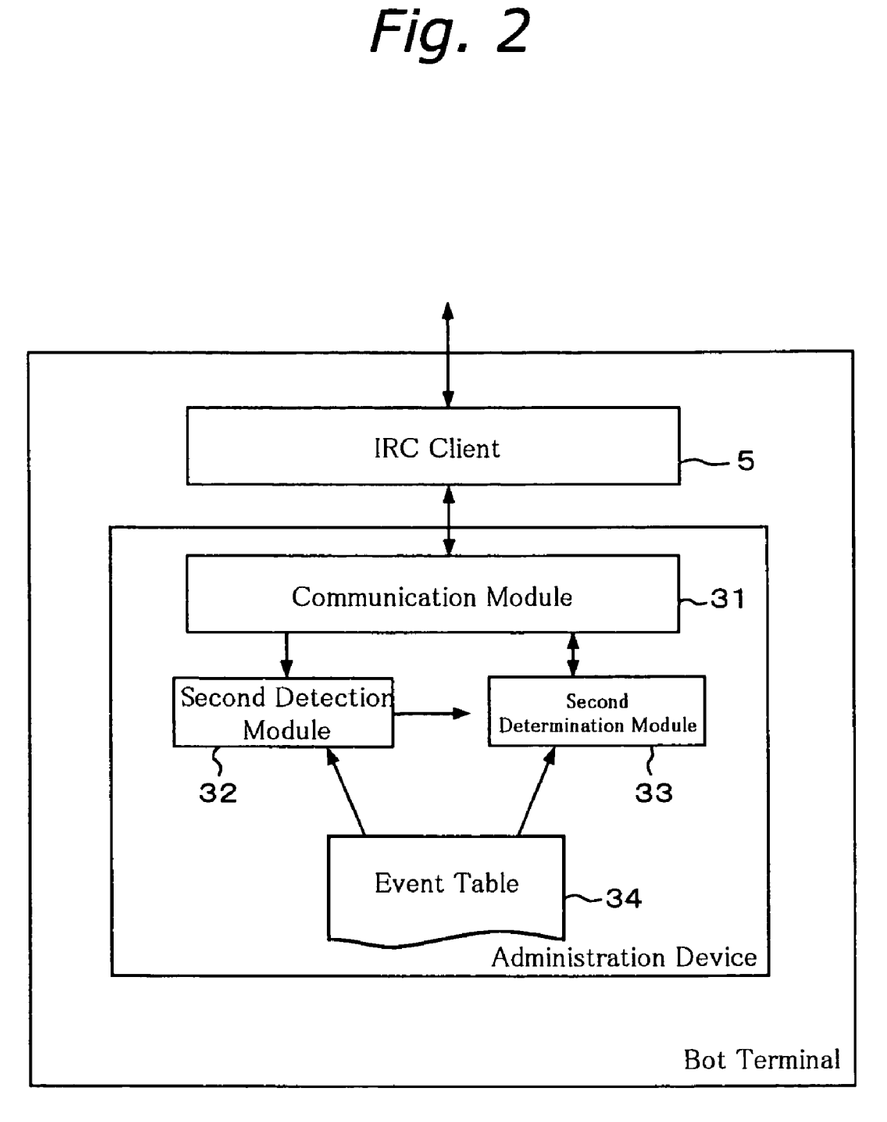
FIG. 2 is a functional structural diagrammatical view of an administration device of the communication promotion system in FIG. 1.

FIG. 2 is a structural drawing showing the functions of an administration device 3. The administration device 3 has a communication module 31, a second detection module 32, a second determination module 33, and an event table 34. The communication module 31 sends and receives data between the second detection module 32, the second determination module 33, and the IRC client 5. The second detection module 32 detects specific events in the channel based on the event table 34. The event table 34 shall be described later.

The second determination module 33 determines an operation instruction corresponding to a specified event based on the event table 34. An operation instruction is used to indicate the operation of the character 2. The second determination module 33 also determines the IRC client 5 that is the destination for the operation instruction. The destination IRC client is selected from among the IRC clients in the channel where the event occurred.

In addition, the second determination module 33 sends a control instruction corresponding to the operation instruction to the destination IRC client 5 based on the event table 34. Sending a control instruction occurs via the communication module 31 and IRC. For example, the second determination module 33 uses a CTCP command and sends a control instruction to the IRC client 5. A control instruction is a command for operating a character. For example, if the character 2 is a character device, the control instruction is expressed in machine language to drive the character device. Specifically, a control instruction specifies, for example, an operation or the continuation time or number of times to repeat, an operation.

The second determination module 33 may also send an operation instruction instead of a control instruction to the IRC client 5. This is because it is possible to have a case in which a control instruction corresponding to an operation instruction depends on the character 2. Also, this is because a user may deliberately enter an operation instruction in order to operate the character 2. In this case, an operation instruction is converted to a control instruction at the user terminal 8.

In this embodiment the second determination module 33 also sends the destination, the originating communication address, destination communication address, event detection time, and serial number in addition to a control instruction or operation instruction. In the following explanation, a "character instruction" can include a control instruction or operation instruction, originating communication address, destination communication address, event detection time, and serial number.

The originating communication address is information that can specify the origin of the administration device 3, i.e. describing the IP address of the administration device 3. The destination communication address is information that can specify the IRC client that is the destination for the operation instruction or control instruction. Examples of this are the IP address of the user terminal operated by this IRC client, or the IRC client's nickname. Also, if everything in a channel is the destination, the channel name is described as the destination. The event detection time is the time when the administration device detects a specific event, to be described later. The serial number is a serial number added to the character instruction sent by the administration device 3.

There may also be cases in which a user terminal has a plurality of characters, and each character is operated in accordance with an event. In this case, the second determination module 33 limits the characters to be operated as follows. 1) Control instructions for each type of character are prepared in advance. Control instructions describe the type of character whose operation is desired. 2) Information specifying a character type is additionally included in the character instruction. 3) The destination communication address includes a character specification.

Here, control instructions for each type of character refers to control instructions for different characters such as "dog", "bird", etc. Also, character specification is not just the character type. It also means specifying which character at the user terminal, because there are user terminals that have a plurality of the same type of character.

Figure 3:
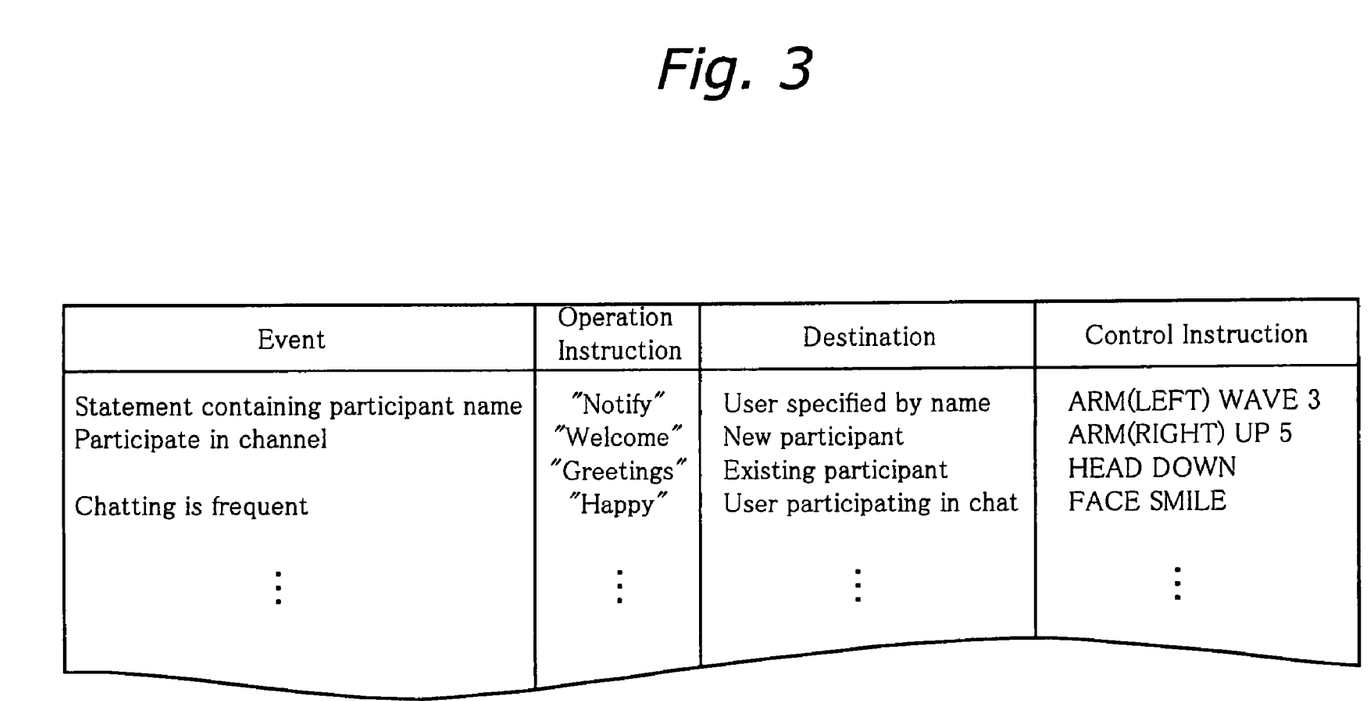
FIG. 3 is a summary table illustrating an event table of the communication promotion system in FIG. 1.

FIG. 3 is a summary drawing explaining the event table 34. The event table 34 correlates and stores events, operation instructions, destinations, and control instructions. In this embodiment, when a specific event occurs, a control instruction corresponding to the event that occurred is sent to the user terminal 8 that is the destination.

Events include the following sort of events, for example.

(1) Participate in a channel, withdraw from a channel (2) The number of participants in a channel exceeds a fixed number (3) Change in channel mode or topic (4) A statement has not been made for longer than a specified time (5) The number of participants in a chat exceeds a fixed number (6) Statement of user nickname or name (7) Chatting is frequent (8) Character specification "Participate in or withdraw from channel" event (1) is an event that means a change in the users in a channel. It is preferable that operation of the character 2 be different for the user who initiated the event and other users. For example, as shown in FIG. 3, the control instruction corresponding to the operation instruction "welcome" is sent to the person joining the channel. The control instruction corresponding to the operation instruction "greetings" is also sent to the other users. "Welcome" corresponds to a control instruction that raises the character 2's right arm for five seconds. The "greetings" command corresponds to a control instruction that bows the character 2's head. By observing the operation of the character 2, a user can identify whether another user joined the channel or he himself joined.

"Number of participants in a channel exceeds a fixed number" event (2) is an event that promotes channel participation by causing a specific operation in the character 2 when the number of participants exceeds a specific number. The control instruction to the character 2 is sent to all user terminals 8 in the channel.

It is also possible to prepare a plurality of operation instructions and control instructions corresponding to an event and make the operation of the character 2 more varied as the number of participants increases. For example, if the character 2 is a famous performer, the character 2 does an operation that mimics the performance of the performer. As the number of participants increases, the character 2's performances become more varied. A user participating in a channel wants to see the character 2 perform, so he urges other users to participate in the channel, resulting in the number of participants increasing.

"Change in channel mode or topic" event (3) is an event that alerts the user to a change in the mode and the like by operating the character 2 when the mode or topic changes. That's because normally it is difficult for a user to know that the mode or the like has changed. In response to an operation instruction, a control instruction that lights a lamp in the character 2 or changes the character 2's display color or the like is sent to all user terminals 8 in the channel.

"Statement has not been made for longer than a specified time" event (4) is an event for encouraging a participant's statement by operating the character 2 so that it takes a nap, for example, if no statement occurs after the passage of a specified time from the last statement. A control instruction corresponding to the operation instruction is sent to all user terminals 8 in the channel.

"Number of participants in a chat exceeds a fixed number" event (5) causes a specified operation in the character 2 at the moment when the number of people participating in a chat exceeds a fixed number. This is to encourage users in a channel to participate in a chat. Different control instructions may be sent to participants and nonparticipants in the chat. The face of the character 2 of a participant may be made to smile, the face of the character 2 of a nonparticipant may be made sad, etc.

The number of people participating in a chat may also be determined by finding the number of chat participants in a past specified time period, based on the channel chat log normally created by the IRC client 5.

"Statement of user nickname or name" event (6) is for attracting the attention of the user who goes by the nickname or name. In FIG. 3, the operation specified by the operation instruction "notice" is caused to occur at the character 2 of the user named by the nickname. In this example, a control instruction that waves the right arm three times is sent to the user's character 2. The control instruction is not sent to the characters 2 of the other users.

"Chatting is frequent" event (7) is an event for encouraging more chat promotion by operating the character 2 when chatting is active. In FIG. 3 a control instruction corresponding to the operation instruction "happy" for making the character 2 smile is sent to the terminals of users participating in the chat. The control instruction is not sent to the terminals of users not participating in the chat.

Furthermore, whether or not "chatting is frequent" can be determined by finding the number of statements or number of statement bits within a past specified time period, based on the previously described chat log, and determining whether or not it exceeds a specified number.

"Character specification" event (8) is an event that operates only a specified character 2 when a single user has a plurality of characters, for example, and a specific character 2 is specified. This event is used in combination with other events. For example, a character 2 can be specified together with a nickname.

In addition, the second determination module 33 can process a plurality of overlapping events by a specified method when events overlap at the same IRC client 5 or character 2. There are two processing methods: 1) sequentially execute operations for a plurality of events, and 2) selectively execute one or a plurality of operations.

In the case of the former method, the second determination module 33 converts the plurality of overlapping events into control instructions in the sequence in which the events occurred and operates the character 2. However, there are instances in which the user's attention is not attracted even if the character 2 performs many operations in a short time. Therefore, if the event occurrence interval is less than a specified time interval, it is preferable that the later method be used.

One example of the latter method is, when the same event occurs within a specified time period, to ignore the second and subsequent occurrences of the same event. It is also possible to send a character instruction only in response to the first or last event within a specified time.

Another example of the latter method is to provide a priority for events in advance. In this case, a priority column is provided in the event table 34. When events occur continuously in a short time only the character instruction corresponding to the highest priority event or a specific number of high priority events is selectively sent to the destination.

Still another example of the latter method is to give priority to events on the current channel rather than events on a subchannel. Events may also be selected based on the destination of the control instruction or operation instruction. For example, events directed at a specific user take priority over events whose destination is the entire channel.

In the method of assigning priorities, it is also possible to set priorities for events at individual user terminals 8, and select a control instruction for each individual user terminal 8. It is also possible to select events according to combinations of priorities set at the administration device 3 and a user's individual priorities. In addition, events can be selected through appropriate combinations of the various previously described methods.

(3) User Terminal

In addition to the IRC client 5, the user terminal 8 is provided with a first detection module 81, a first determination module 83, and a character communication module 82.

The first detection module 81 detects character instructions sent from the administration device 3 using messages sent and received by the IRC client 5.

The first determination module 83 extracts control instructions from character instructions and passes them to the character communication module 82. If an operation instruction is described in the character instruction, the first determination module 83 converts the operation instruction to a control instruction and passes it to the character communication module 82. The first determination module 83 should be provided with a table correlating control instructions and operation instructions.

The character communication module 82 sends and receives data between the character 2 and the first detection module 81 if the character 2 has a physical substance. In this case, a communication library utilizing driver software normally installed in a PC is utilized in the character communication module 82. If the character 2 is a virtual character, the character communication module 82 passes control instructions to the character 2. In this case, an ordinary inter-module communication method is used.

(4) Character

The character 2 has a terminal communication module 21 and an operation module 22. If the character 2 has a physical substance, the terminal communication module 21 has an IC containing a program for receiving control instructions via a serial cable or the like from the user terminal 8. If the character 2 is a virtual character, the terminal communication module 21 receives control instructions from the character communication module 82.

If the character 2 has a physical substance, the operation module 22 operates the character 2 mechanically based on the control instruction. According to the operation, the operation module 22 can also create a sound or turn a lamp installed in the character 2 on and off. If the character 2 is a virtual character, the operation module 22 is a program that displays the character 2 on the user's screen and operates it.

In addition, if the character 2 has a physical substance, it can be used as an input means for the character 2. For example, when user A joins a channel, a user can make a statement rejecting user A's participation by performing the operation "kick" at the character 2.

It is also possible to provide the right to make a statement by doing a specific operation such as hitting the character 2 on the head, for example. It is preferable that a user be able to easily know his own character status—when the user has the right to make a statement and when he does not—by changing the character color, for example. In addition, it is preferable that a request for the right to make a statement be sent only when a character that does not have the right to make a statement performs a specific operation.

Processing Flow

Figure 4:
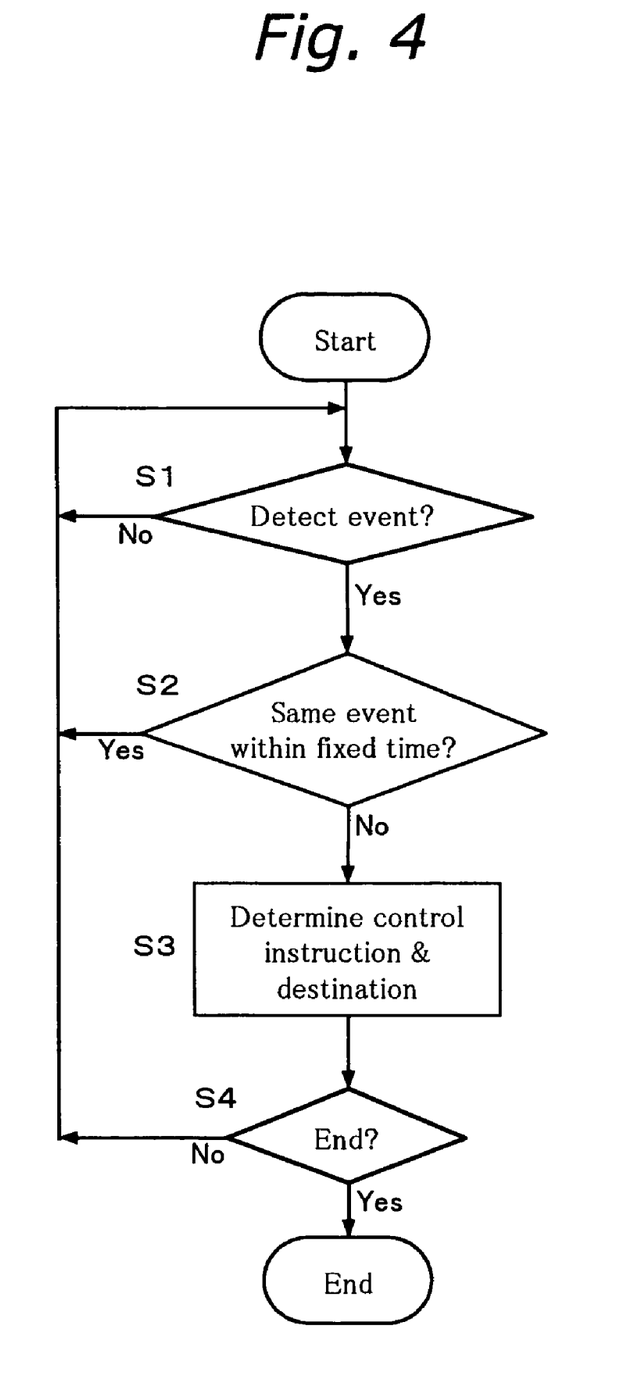
FIG. 4 is a flowchart of processing performed by the administration device of the communication promotion system in FIG. 1.

FIG. 4 is a flow chart showing the flow of processing performed by the administration device 3.

This example explains processing that uses a method such that when the same event occurs within a specified time period, an event is selected by ignoring all events other than the first. The administration device 3 starts the following processing by starting an ICR client 5 in the bot terminal.

In Step S1, the administration device 3 waits for the occurrence of a specified event. When it decides the event has occurred, the flow shifts to Step S2. If it decides the event has not occurred, it returns again to Step S1 and waits for the next event.

In Step S2 the administration device 3 decides whether or not the same event has occurred within a predetermined specific time period. If it decides "Yes", it returns to Step S1. If it decides "No", the flow shifts to Step S3.

In Step S3 the administration device 3 decides the operation instruction corresponding to the event that occurred, based on the event table 34. Next, based on the operation instruction, it decides the destination of the control instruction. For example, if user A joins a channel, the control instruction corresponding to the "welcome" command is sent to user A's terminal and the control instruction corresponding to the command "greetings" is sent to other terminals. Each terminal's IP address can be obtained from the IRC client 5. The administration device 3 sends a character instruction to the decided-upon destination using a CTCP command, for example. A character instruction includes a control instruction, administration device 3's IP address, destination user terminal IP address, event detection time, and serial number.

In Step S4 the administration device 3 decides whether or not the IRC client 5 has finished. If it decides "No", it returns to step S1 again to wait for the next event. If it decides "Yes", the processing ends.

Second Embodiment

Constitution

Figure 5:
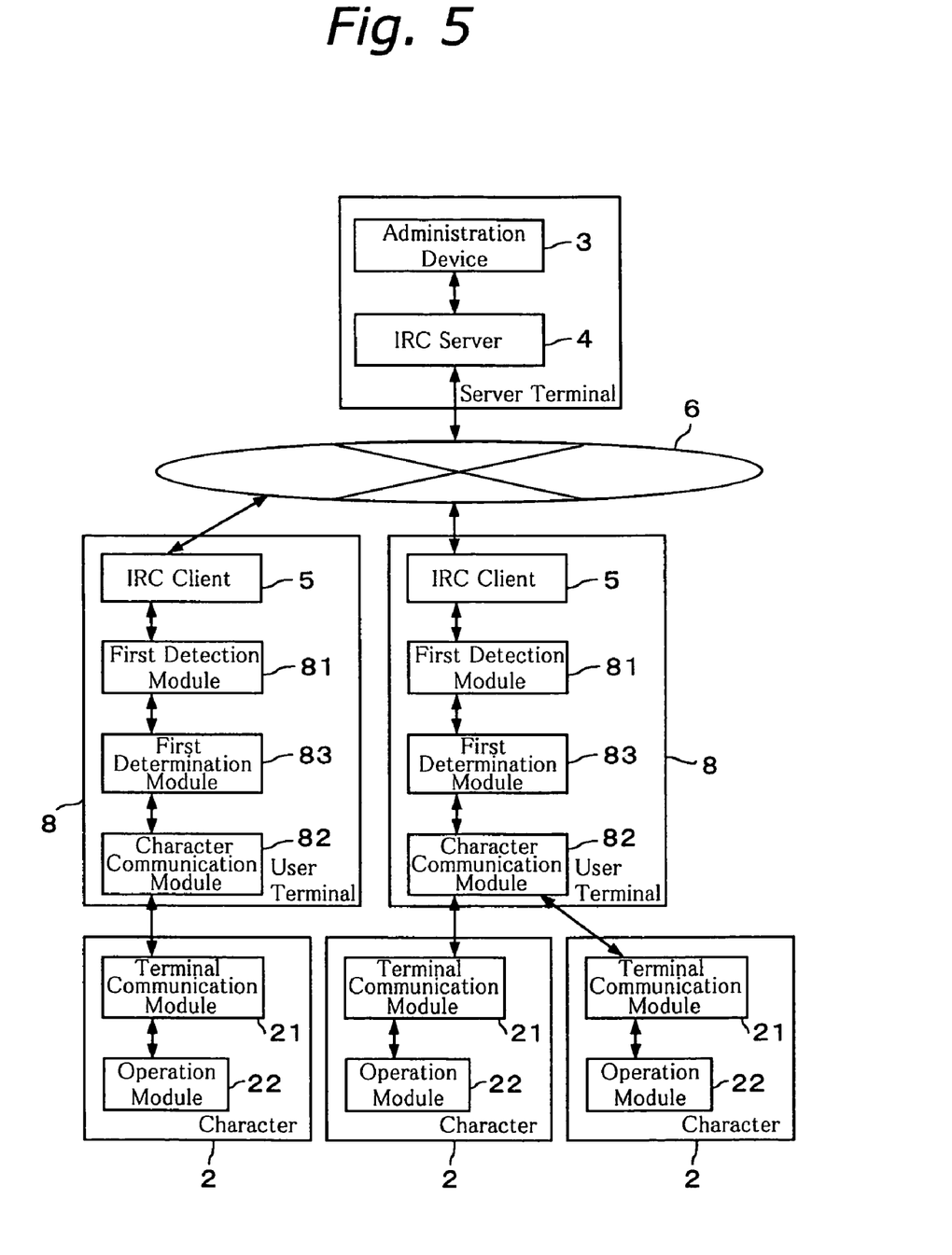
FIG. 5 is an overall structural diagrammatical view of a communication promotion system in accordance with an alternate embodiment of the present invention.

FIG. 5 shows the overall structure of a communication promotion system in accordance with a second embodiment of the present invention. The communication promotion system in this embodiment has the same structure as the first embodiment, except that the administration device 3 is provided in the server terminal where the IRC server 4 operates, and the bot terminal 7 is not provided.

Processing Flow

The communication promotion system in this embodiment performs the same processing as the aforesaid first embodiment. However, processing starts when the IRC server 4 starts.

In this embodiment, information that cannot be detected by the administration device 3 in the bot terminal 7 in the aforesaid first embodiment can be used as an event.

Third Embodiment

Constitution

Figure 6:
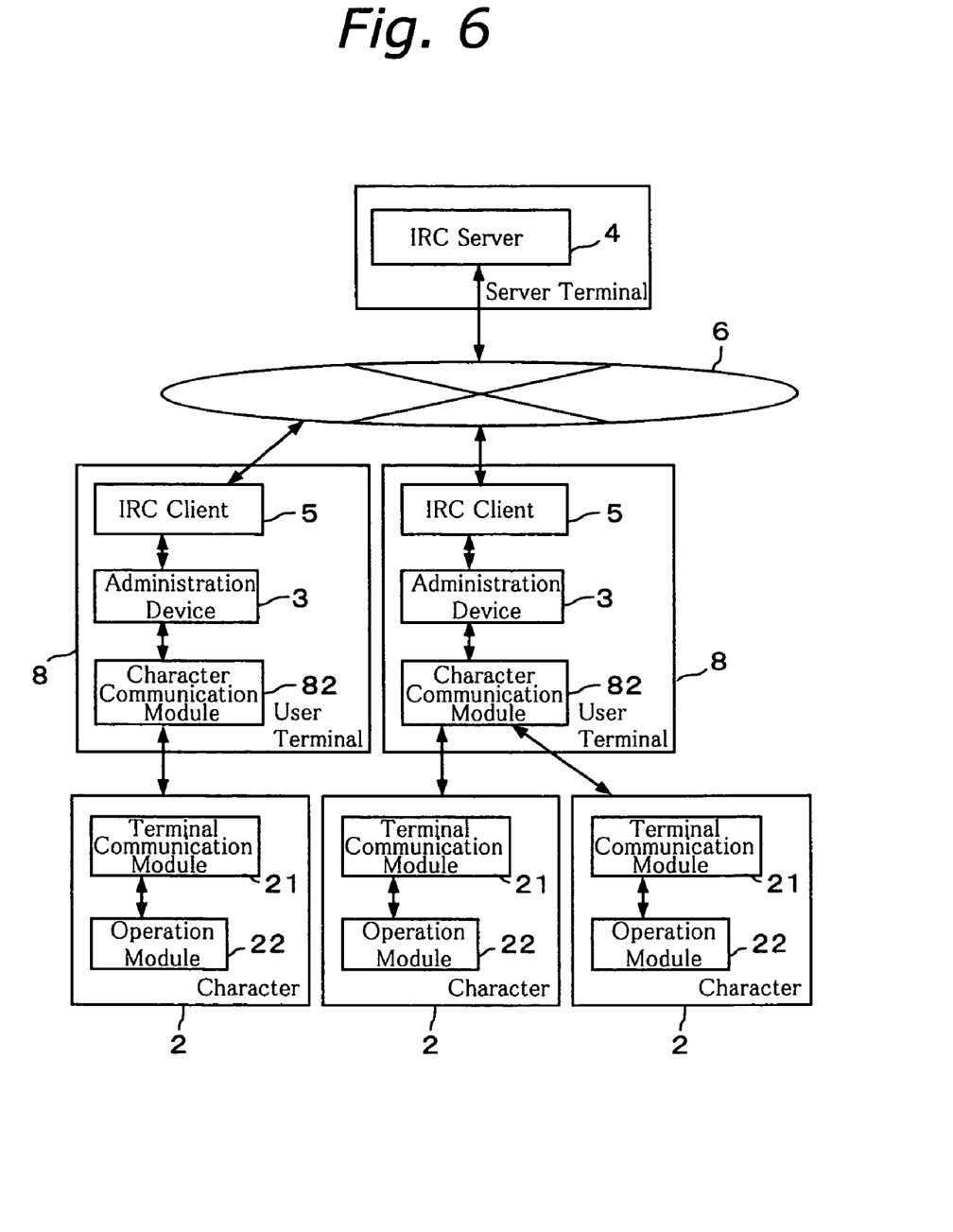
FIG. 6 is an overall structural diagrammatical view of a communication promotion system in accordance with an alternate embodiment of the present invention.

FIG. 6 shows the overall structure of a communication promotion system in accordance with a third embodiment of the present invention. The structure of the character 2 in this embodiment is the same as in the aforesaid first or second embodiment. However, this embodiment differs from the aforesaid embodiments in that the administration device 3 is provided in each user terminal 8. The administration device 3 basically controls only the character 2 linked to or installed in each user terminal 8. The administration device 3 in this example can also control the character 2 in another user terminal 8. However, if characters 2 in a plurality of terminals are controlled by the administration device 3, it is preferable that the constitution of the aforesaid first or second embodiment be used. That's because the system structure is simpler.

In addition to the ICR client 5, the user terminal 8 has the administration device 3 and the character communication module 82. The character communication module 82 sends and receives data between the administration device 3 and the character 2.

Processing Flow

The administration device 3 in this embodiment performs the same processing as the administration device 3 in the first embodiment. However, when deciding a control instruction's destination there are instances in which the user terminal 8 has a plurality of characters 2, and an event occurs that specifies one or more of the character 2. Also, the administration device 3 sends the control instruction to the character communication module 82, not the IRC client 5.

Fourth Embodiment

Constitution

The communication promotion system in accordance with this embodiment has the same structure as the first or second embodiment. However, the function of the first determination module 83 provided in the user terminal is different. Specifically, in this embodiment the first determination module 83 rearranges and selects control instructions based on the received character instruction. Below, the function of the first determination module 83 shall be explained while giving a specific example.

Figure 7:
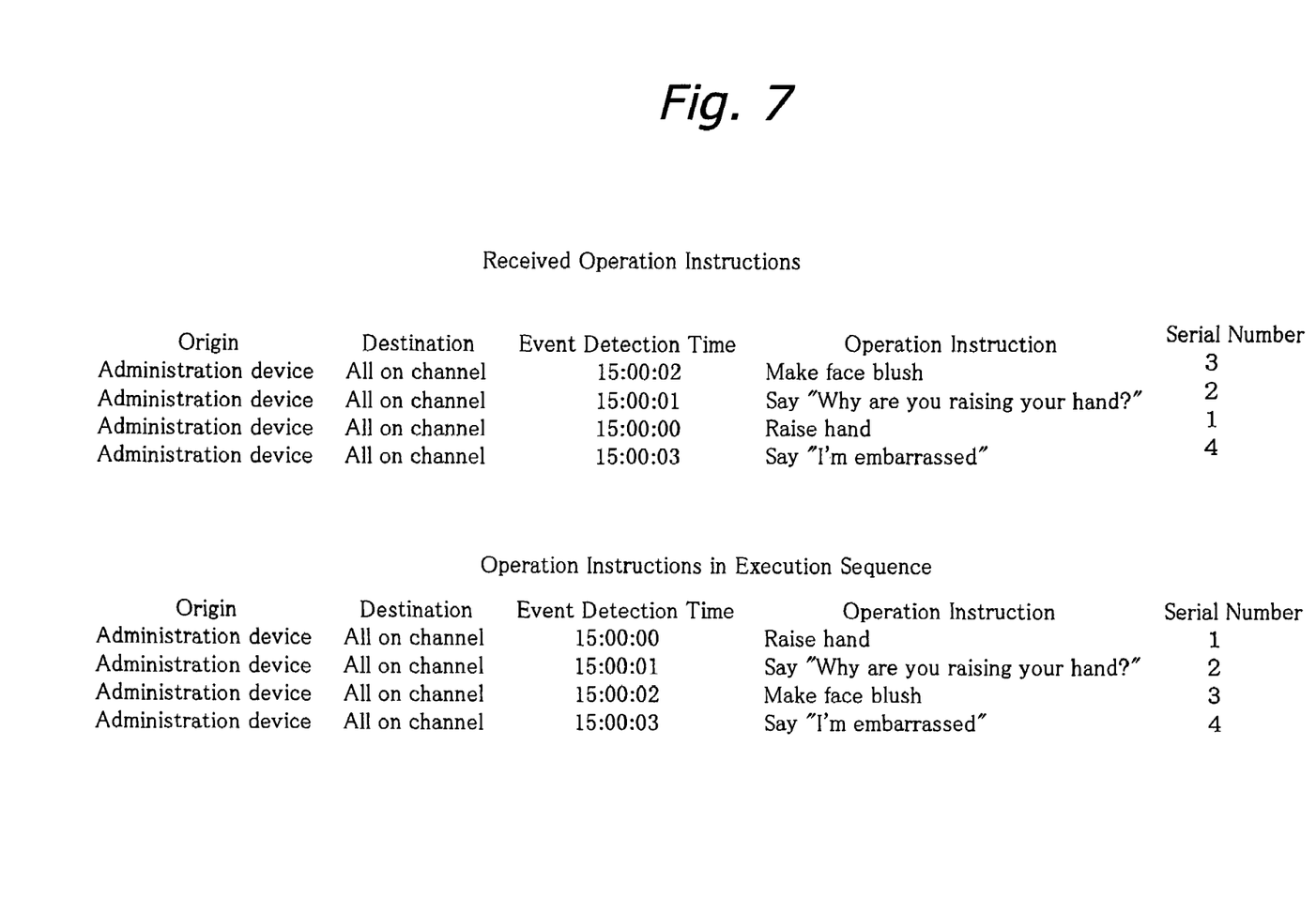
FIG. 7 is a drawing illustrating an example of operation instructions in reception sequence and execution sequence at user terminal in accordance with an embodiment of the present invention.

For example, sometimes character instructions do not arrive in the sequence in which the administration device sent them because of network traffic and other such conditions. FIG. 7 shows the operation instructions arranged in the sequence in which the first determination module 83 received the character instructions, and the operation instructions rearranged in execution sequence by the first determination module 83. Character instructions showing this sort of series of character operations may be received out of order. In this case the first determination module 83 rearranges the operation instructions in the event detection time sequence and serial number sequence and sends the control instructions to the character in that order.

The first determination module 83 may also select character instructions based on the origin or destination. For example, regardless of the selection of events converted into character instructions by the administration device 3, if a plurality of character instructions is received within a specified time period, character instructions from a specified user take priority over character instructions from the administration device 3. Also, for example, character instructions to oneself take priority over character instructions whose destination is everyone in the channel.

In addition, the first determination module 83 can decide the destination based on the control instruction in the character instruction. For example, if control instructions are different for each character type, the first determination module 83 sends extracted control instructions just to the operable characters, based on the control instructions in the character instruction. In this case the first determination module 83 needs to store control instructions for each character.

Since operation instructions may be described in a character instruction, it is preferable that the first determination module 83 have a table correlating operation instructions and control instructions. If control instructions are different for each type of character, this table is prepared in advance for each type of character. By doing so, the first determination module 83 can convert operation instructions in a character instruction to control instructions corresponding to each character.

For example, suppose a user terminal has a character device "dog" and a virtual character "bird". If the operation instruction "happy" is received, the first determination module 83 sends "dog" a control instruction to wag its tail. And it sends "bird" a control instruction to flap its wings.

While only selected embodiments have been chosen to illustrate the present invention, to those skilled in the art it will be apparent from this disclosure that various changes and modifications can be made herein without departing from the scope of the invention as defined in the appended claims. Furthermore, the foregoing description of the embodiments according to the present invention is provided for illustration only, and not for the purpose of limiting the invention as defined by the appended claims and their equivalents.

What is claimed is:

1. An administration device used in a chat system having a plurality of chat devices which share any number of virtual chat spaces being configured on a network and which send and receive messages among themselves, comprising:

an association table stored in a storage that relationally stores a predetermined event occurring in a chat space with participating chat devices, a plurality of predetermined different control instructions, and a plurality of predetermined different correlated operation instructions that correspond to the predetermined event, wherein the plurality of predetermined different control instructions correspond to a plurality of types of image representations and/or physical representations among the chat devices, and the plurality of predetermined different correlated operation instructions correspond to a plurality of different chat device destinations to operate image representations and/or physical representations of chat participants that are linked to or installed in the chat device destinations;

a chat event detector detecting a predetermined event in the chat space, based on the association table;

an operation instruction determiner determining the plurality of the different operation instructions for the detected event, based on the association table;

a destination determiner determining the corresponding plurality of the different chat device destinations to be transmitted the determined plurality of the different operation instructions, based on the association table; and a transmitter transmitting the determined plurality of the different control instructions and/or the determined plurality of the different operation instructions corresponding to the event via the chat system to the determined corresponding chat device destinations to operate the image representations and/or the physical representations of the chat participants that are linked to or installed in the chat device destinations, and wherein the image representations and/or physical representations of the chat participants are operated by the transmitted determined plurality of the different control instructions and/or the determined plurality of the different operation instructions corresponding to the event.

2. The administration device set forth in claim 1, wherein the transmitter transmits an originating address of each determined operation instruction, a destination address of each determined operation instruction, and an event detection time, to each corresponding different chat device destination together with the determined operation instruction.

3. The administration device set forth in claim 1, additionally comprising a controller selecting a plurality of operation instructions that correspond to events in the chat space to operate the image representations and/or the physical representations of the chat participants, based on predetermined conditions when the plurality of the operation instructions occur with a same chat device as a chat device destination, and sending the selected plurality of the operation instructions to the same chat device.

4. The administration device set forth in claim 1, wherein when the image representations and/or the physical representations of the chat participants are linked to or installed in one of the chat devices, the destination determiner determines one of the plurality of the image representations and/or the physical representations of the chat participants to operate from among the image representations and/or the physical representations of the chat participants, based on the detected event, and the transmitter sends a determined operation instruction including a specification of the image representations and/or the physical representations of chat participants to the corresponding chat device destination to operate therein the specified image representations and/or physical representations of the chat participants.

5. The chat administration device according to claim 1, wherein the chat event detector detects the predetermined event from among a plurality of association table events comprising participate in the chat space, withdraw from the chat space, a number of chat participants in the chat space exceeds a predetermined number, a change in a mode or a topic of the chat space, a chat statement has not been made for longer than a specified time, a statement of a chat participant nickname or name, chatting is frequent, and specifying a chat participant image representation and/or physical representation.

6. The chat administration device according to claim 1, wherein if the chat event detector detects a plurality of the events at same chat device destination or at same image representation and/or physical representation of a chat participant, as overlapping events, the operation instruction determiner processes the detected overlapping events according to a specified event processing method.

7. The chat administration device according to claim 6, wherein the specified event processing method is one of sequentially executing the detected overlapping events, and selectively executing one or a plurality of the detected overlapping events.

8. The chat administration device according to claim 1, wherein if the chat event detector detects a plurality of the events at same chat device destination or same image representation and/or physical representation of a chat participant, as overlapping events, the operation instruction determiner selects one or a plurality of the detected overlapping events according to one or more selection criteria comprising:

if same event occurs within a specified time period, ignoring second and subsequent occurrences of the same event, selecting a first or a last event within a specified time, or selecting one or a plurality of the detected overlapping events according to a priority assigned to each event in the association table.

9. The chat administration device of claim 8, wherein the event priority assignment comprises:

when events occur continuously in a short time, only an operation instruction corresponding to a highest priority event or a specific number of higher priority events is selectively sent to a chat device destination or an image representation and/or physical representation of a chat participant, giving priority to events on a current chat space rather than to events on a sub-chat space, or giving priority to events based on a destination of the corresponding operation instructions.

10. A computer-readable recording medium recording an administration program controlling a chat administration device in a chat system in which a plurality of chat devices share any of virtual chat spaces operating on a network and send and receive messages among themselves, according to a process comprising:

preparing an association table that relationally stores a predetermined event occurring in a chat space with participating chat devices, a plurality of predetermined different control instructions that describe the type of image representations and/or physical representations of the participating chat devices, and a plurality of predetermined different correlated operation instructions that correspond to the predetermined event, wherein the plurality of predetermined different control instructions and the plurality of predetermined different correlated operation instructions correspond to a plurality of different chat device destinations to operate image representations and/or physical representations of chat participants that are linked to or installed in the chat device destinations;

detecting a predetermined event in the chat space, based on the association table, determining the plurality of different control instructions for the detected event, based on the association table, determining the plurality of the different operation instructions for the detected event, based on the association table;

determining the corresponding plurality of the different chat device destinations to be transmitted the determined plurality of the different operation instructions, based on the association table; and transmitting the determined plurality of the different control instructions and/or the determined plurality of the different operation instructions corresponding to the event via the chat system to the determined corresponding chat device destinations to operate the image representations and/or the physical representations of the chat participants that are linked to or installed in the chat device destinations, and wherein the image representations and/or physical representations of the chat participants are operated by the transmitted determined plurality of the different control instructions and/or the determined plurality of the different operation instructions corresponding to the event.

11. A computer-readable recording medium recording an administration program controlling a chat administration device used in a chat system having a plurality of chat devices which share any of virtual chat spaces being configured on a network and send and receive messages among themselves, according to a process comprising:

preparing an association table that relationally stores a predetermined event occurring in a chat space with participating chat devices, a plurality of predetermined different control instructions that describe the type of image representations and/or physical representations of the participating chat devices, and a plurality of predetermined different correlated operation instructions that correspond to the predetermined event, wherein the plurality of predetermined different control instructions and the plurality of predetermined different correlated operation instructions correspond to a plurality of different chat device destinations to operate image representations and/or physical representations of chat participants that are linked to or installed in the chat device destinations;

detecting a predetermined event in the chat space, based on the association table;

determining the plurality of different control instructions for the detected event, based on the association table, determining the plurality of the different operation instructions for the detected event, based on the association table; and transmitting the determined plurality of the different control instructions and/or the determined plurality of the different operation instructions corresponding to the event to the plurality of different chat device destinations to operate the image representations and/or the physical representations of the chat participants that are linked to or installed in the chat device destinations, and wherein the image representations and/or physical representations of the chat participants are operated by the transmitted determined plurality of the different control instructions and/or the determined plurality of the different operation instructions.

* * * * *

UNITED STATES PATENT AND TRADEMARK OFFICE
CERTIFICATE OF CORRECTION

PATENT NO. : 7,426,536 B1
APPLICATION NO. : 09/628352
DATED : September 16, 2008
INVENTOR(S) : Masahide Noda et al.

It is certified that error appears in the above-identified patent and that said Letters Patent is hereby corrected as shown below:

Column 13, Line 34, change "table stored in a storage" to --table, stored in a storage,--.

Signed and Sealed this

Thirteenth Day of January, 2009

JON W. DUDAS
*Director of the United States Patent and Trademark Office*